UNITED STATES PATENT OFFICE.

CHARLES M. HIGGINS, OF NEW YORK, N. Y.

ADHESIVE COMPOUND.

SPECIFICATION forming part of Letters Patent No. 610,182, dated September 6, 1898.

Application filed November 12, 1897. Serial No. 658,293. (No specimens.)

*To all whom it may concern:*

Be it known that I, CHARLES M. HIGGINS, a citizen of the United States, residing at New York, (Brooklyn,) in the county of Kings and State of New York, have invented a certain new and useful Improvement in Adhesive Pastes, of which the following is a specification.

My present invention relates in part to that class of paste or adhesive compounds set forth in my United States patents of March 30, 1897, No. 579,827, and of April 6, 1897, No. 580,174, which are made by digesting or partly digesting starch in a digesting fluid and arresting the digestion at a certain point. My present improvement lies in the special nature of the digesting agent used, in its mode of final combination with the starch, and in the special combination of ingredients and the special process employed, as hereinafter fully set forth.

It has been heretofore well known that most acids will digest or liquefy starch when the starch is boiled or heated in a dilute solution of the acid; but I have discovered that solutions of salts of alumina, particularly sulfate of alumina, will readily digest starch with some important advantages over acids, and this forms one feature of my invention.

Another novel feature of my invention is that after the starch has been dissolved in the digesting salt of alumina I add an alkali or an alkaline salt to decompose the digesting salt, and thus produce a soft flocculent or gelatinous precipitate of alumina, which becomes diffused through and combined with the starch and adds important qualities to the resulting paste, as hereinafter shown. I prefer to use borax and an alkali, added successively, to neutralize the alumina salt and produce the gelatinous deposit or hydrate; but either the borax or alkali may be used alone.

I do not limit myself to starch in this system, as any other neutral adhesive substance my be used. By "neutral" I mean any substance which has no decomposing reaction on the salt of alumina itself, or, rather, that does not combine chemically with the alumina, but leaves it free in the form of a soft precipitate or gelatinous hydrate, such as flour, starches, or other carbohydrates. Neither do I limit myself to salts of alumina, as equivalent materials, such as salts of zinc and other substances or metals, may be used which will give gelatinous or soft flocculent precipitates on decomposition, always preferably using those salts which have a strong digesting action, and which usually have a strong acid reaction, whose precipitates are white and have more or less of an adhesive or gelatinous nature, the best type of this class being the simple salts of alumina.

My invention, therefore, consists mainly in the features above outlined, as hereinafter fully set forth and claimed.

In describing the practical working of my invention I will first give an actual working formula of one embodiment of my invention, which may be taken as a model formula, showing the principle and operation of the invention and also the preferred practical method for producing a superior adhesive paste for ordinary or general use. Take one pound of sulfate of alumina, preferably finely ground or powdered, and add this to two pounds of powdered starch and mix the two intimately. Then stir this mixture into one gallon of water heated in a jacketed kettle to a temperature below the jellifying-point of the starch, say from 150° to 170° Fahrenheit. This will make a milky fluid, which should be kept constantly stirred while heat is applied to gradually raise the temperature of the mixture. The sulfate of alumina will immediately dissolve in the water and commence to digest the starch, which latter will first jellify and then digest in the solution as the heat is continued. When the mixture acquires a temperature of about 185° Fahrenheit, it will form a soft gelatinous paste, which will gradually become softer and finally liquefy, losing its gelatinuous nature entirely, or almost entirely, as the temperature rises. The sulfate of alumina in solution in such a large proportion thus actually converts or digests the starch, acting the same as a digesting acid, but with special advantage, as will appear later. The digestion may be arrested at any stage desired, while the starch is yet gelatinous or after it has become fully liquefied, by stopping or arresting the heat or by adding a neutralizing alkali or alkaline salt, according to the consistency or character of the paste desired to be produced. In this preferred formula we assume that the digestion will be carried so far as to fully liquefy the starch, producing a running or nearly-running opalescent liquid, which will appear at about a temperature of 195° Fahrenheit and within about forty to sixty minutes after the starch has been added. When this stage is reached, I add one and one-half pounds of borax mixed with about one-half gallon of water, making a milky gruel, and I now pour this "borax gruel" very slowly and gradually into the solution of digested starch, stirring constantly. The borax will at once dissolve and arrest further digestion by neutralizing the sulfate of alumina, and thereby decomposing the sulfate at the same time, it will produce a soft precipitate of gelatinous hydrate of alumina, which will become evenly diffused all through the mass of digested starch, producing a smooth homogeneous paste of a beautiful alabaster-white color of good body and of semifluid consistency. The heat is continued during the addition of the borax, at which time the temperature will fall, but is allowed to again rise until the borax is fully dissolved and the deposit of the gelatinous hydrate is formed, as described, which will take but a few minutes, during which the temperature is usually allowed to rise to about 175° to 185° Fahrenheit, when the heat is shut off. The reaction of the mixture will still be slightly acid notwithstanding the large proportion of borax added, the acidity probably being due to the sulfate of soda formed in the reaction and to some boracic acid set free in the mutual decomposition of the sulfate of alumina and the borax. In most cases I prefer to add at this point five fluid ounces of caustic-soda lye of 40° Baumé or the same quantity of aqua-ammonia 20°, which will increase the viscosity and the adhesiveness of the paste and also act as an antiseptic, and this will give the paste a slightly-alkaline reaction, which is more desirable. This addition of the caustic alkali, however, while a great improvement, is not essential. At this stage any flavoring substance or aromatic antiseptic may be added, and the paste will then be finished and may be run off into receptacles or packages and allowed to cool, when it will become somewhat thicker, assuming a soft pasty semifluid or non-flowing consistency, and it is then ready for use.

The paste thus produced will have the following qualities: It will contain about seventy-three per cent. of water and about twenty-seven per cent. of solid matter, the gelatinous alumina forming a very large part of the bulk, fully one-third or one-half that of the digested starch. The paste will be extremely soft, homogeneous, and smooth, of a brilliant and unchanging white color with an alabaster tint, and it will spread under the brush with great ease into a smooth unctuous film, not showing any gelatinous granulation like the ordinary starch or flour paste. The element of the digested starch in this paste possesses in itself a most positive and active adhesiveness, while the soft gelatinous hydrate of alumina diffused all through the starchy mass also possesses a decided adhesiveness, but of a more inert, mild, or passive kind, which makes a most desirable combination with the positive adhesiveness of the starch, and it has the effect of giving to the very adhesive but more fluent starch a much greater "body" or substance and an extraordinary quick glue-like "catch" or immediate stickiness, notwithstanding the very large percentage of water held by the paste. This property of the gelatinous hydrate of alumina also prevents the paste striking through to any extent, as it seems to stop or fill the pores of the paper or other surface to which it is applied, thus acting as a filling which stops penetration, and as it has great affinity for the hydrating water it thus holds it tenaciously and prevents too rapid drying, which would be objectionable for many purposes, so that this paste possesses in a remarkable degree not only great body for its great amount of moisture, but also a quick and tenacious glue-like adhesiveness when spread, with great cementing power when finally dried.

For paper-hanging this paste is admirably adapted, as it spreads very smoothly and easily, sticks immediately, yet dries slowly, and thus gives ample time for manipulation and does not strike into paper or wall. It is also specially good for labeling on either absorbent or non-absorbent surfaces—such as wood, glass, or metal—and will even stick labels on bright tin most securely, which is a very critical work. For the latter purpose it would appear that the gelatinous metallic oxid or hydrate all through the paste seems to get a chemical adhesion with the metallic surface, which insures the adhesion of the pasted label, and in the case of the absorbent wood the filling property of the gelatinous hydrate before referred to prevents the striking in of the paste into fibers or pores, so that on such different surfaces as tin and wood the paste is able to stick at once and adhere permanently, which are the most important qualities adapting this paste for general use in the various trades and manufactures.

It will thus be seen that by my present method of manufacture the digesting element of the paste is made also to serve as a contributory adhesive element of great value, and as this element is very cheap and of an innocuous mineral nature and employed in a large percentage it greatly reduces the cost of manufacture and renders the paste proof to the rapid change and decay to which ordinary starch or flour pastes are subject.

It will be noted that the mixture of the powdered starch and sulfate of alumina or other digesting salt together forms *per se* a new paste-making compound in dry or powdered form, which will produce an improved adhesive paste by simply dissolving the said mixture or powder in hot or boiling water until the starch is digested. The product of this action will be an improved paste, practical and fit for immediate use without addition of any other ingredient. When, however, the precipitating element or alkaline substance is added to this product, a still greater effect is obtained, and the paste may then be diluted with about fifty per cent. more water and yet have as much or more body. and fully as great if not greater adhesiveness with a slower drying quality as before described, which is very valuable for work requiring much manipulation or delay after pasting.

Instead of using borax or borax and an alkali as the percipitating agent an equivalent amount of caustic alkali or other precipitant may be used alone. In the formula given about eleven fluid ounces of lye at 40° Baumé would be such equivalent.

The proportions of neutralizing or decomposing alkali I have here given correspond to the specified quantity of commercial sulfate of alumina, which is very acid, but where purer or less acid sulfate is used correspondingly less alkali will be necessary for its neutralization or decomposition, as will be readily understood.

Of course it is not necessary always to mix the starch and sulfate together dry, as the sulfate may be dissolved in the water and the starch then added, as will be understood, but the order first named will be preferred in many cases. Neither is it necessary in all cases to continue the digestion of the starch in the sulfate solution till actually liquefied or converted. The action may be stopped at merely the "starch-paste" or "gelatinous" stage and the precipitating element then added, but in this case a much less proportion of starch will be required to produce a paste of the same consistency, which at the same time will be much weaker and less adhesive, as will be readily appreciated. It may be here generally stated that more or less than two pounds of starch to the gallon of water, as in the model formula, may be used. Where the digestion is not carried far, less may be used, and where it is carried so far as to render the starch very fluent more than two pounds—up to, say, four or more pounds to the gallon—can be used, as is described in my former patent, No. 579,827, of March 30, 1897, on which the process herein described is an improvement.

Starch of any kind may be used in this process, and flour of any of the cereals may be substituted for the starch with no essential difference in result. Besides flour or starches other carbohydrates and adhesives may be used, all these adhesive substances having little or no decomposing action on the solution of sulfate of alumina when dissolved therein. It is desirable or important, however, that the adhesive substances dissolved or diffused in the sulfate solution be of a more or less pasty nature and not liquid or too fluent, as in such cases, on adding the precipitating element, the gelatinous hydrate would not be held diffused in a homogeneous manner throughout the adhesive mass, but would separate and gravitate in a basic layer, and thus defeat one of the main objects of this invention. Hence in cases where other adhesive substances are substituted for the starch which are more soluble than starch a much larger proportion must be used relatively to the volume of water to get the dense or pasty consistency described, which is necessary to hold up the gelatinous alumina. Thus where two pounds of starch to the gallon of water, more or less, are ample for this purpose in the model formula, yet more than twice this proportion of a very soluble adhesive substance would be required to get the dense or viscous consistency to suspend the gelatinous hydrate, as will be readily understood.

It will be noticed that an essential feature of the invention which forms the subject-matter of this application consists in an adhesive paste composed of a starchy or primary adhesive substance in aqueous solution impregnated with a large percentage of gelatinous alumina diffused through the adhesive solution and imparting a nonfluid or gelatinous consistency thereto. Hence in some cases the gelatinous hydrate may be formed or prepared separately and then mixed with a solution of the adhesive matter, but the preferred process described is simpler, more direct, less expensive, and gives better results.

I do not limit myself, however, to any exact proportions of the gelatinous hydrate or oxid, more or less, relatively to the adhesive substance, except such a substantial proportion as materially effects the consistency of the compound and imparts a decided body thereto, or such a proportion which, while increasing the body, produces a positively white color in the product, as this is a distinguishing novel feature in my invention. Any salt having a digesting action, with the qualities described, may be used in my process; but the simple salts of alumina are found to be the best for the purpose of this invention. Most of the double salts or common alums, particularly ammonia-alum, have little digesting action on starch as compared with sulfate of alumina, their efficiency being about one-half that of the sulfate, weight for weight. In the case of the sulfate of alumina, however, it is found that the digesting action is very positive, and not only with the commercial salt, but with the chemically-pure salt, which would seem to indicate that the digesting action is not due to free acid or acidity in the salt, but purely to the action of the salt *per se*.

I may mention a few other metallic salts which have a decided digesting action on starch and which may sometimes be used, such as the bisulfates of magnesia, potassium, &c., and also the binoxalates; but none of these is as effective as the salts of alumina. In the case of the other metallic salts which give very white and soft flocculent precipitates—such as the sulfate of zinc, magnesia, &c.—but whose digesting action on starch is not very strong, a little free acid may be added to their solutions to promote the digesting action. This acid will afterward be neutralized by the precipitating element or alkaline salt added in the process of completing the paste, as already described.

I do not limit myself to the specific list of salts mentioned, as any other salt which will digest starch and which will produce on decomposition a gelatinous or soft flocculent precipitate will be an equivalent of the preferred salts of alumina. It will be noted that not only does the precipitate from the decomposed salts referred to add body to the adhesive compound, but also imparts to a remarkable degree a very brilliant white color. Some salts, like the salts of zinc and magnesia, will not add so much body as the salts of alumina, but will add a very brilliant white color, whereas the salts of alumina greatly add to both the body and the whiteness of the product, which are very desirable and novel features in my present process of paste manufacture.

It will be noted that in my preferred formula not only do I use the sulfate of alumina as a digesting agent and when decomposed as an important contributory adhesive element, but that I use it in a very large proportion relatively to the starch, as this is necessary both for effective digestion and the other purpose mentioned. The sulfate, however, may be used in a much smaller proportion than one-half of the starch, but will not have marked efficiency as a digester much below one-sixth to one-eighth of the weight of the starch.

It is of course well known that alums have been commonly used in making starch and flour pastes, but always in a very small proportion and chiefly for their antiseptic qualities and not with any of the objects in view as are presented in my invention and without accomplishing any of the results, or being capable of producing such results, as I have set forth, as in these cases the alum has not been used in sufficient proportion to digest the starch, and the alumina is not set free and forms no substantial part of the adhesive mass, which materially affects its color and consistency, as in my invention.

I much prefer to conduct the digestion, as described, at a temperature below the boiling-point in open vessels; but if it is desired to conduct it at a higher temperature in closed vessels the digesting action will of course be stronger and require less time for its completion and less of the digesting salt, as will be readily understood.

It will be seen that the first and simplest stage of my invention consists of the mixture of dry or raw starch and the sulfate of alumina, forming a prepared paste-powder which is a material improvement on that paste-powder shown in my former patent, No. 580,174, of April 6, 1897, although it is subordinate to the broad claims in said patent. In that patent the chief digestive agents are liquid corrosive acids, with which the starch is moistened or impregnated. In the present case an entirely dry granulated or powdered digesting salt, such as the sulfate of alumina, is mixed with the starch in large proportion. This has the great advantage of producing a mixture which is perfectly safe to handle under all conditions, is innocuous and non-corrosive in any package in which it may be placed, and secures other valuable qualities when the powder is dissolved and neutralized, as already set forth. I do not, however, claim this feature of my invention in this application, having reserved it for the subject of a separate application, filed July 2, 1898.

What I claim as my invention is—

1. An improved adhesive substance, consisting of starch digested in solution of a salt of alumina, or its specified equivalent to a non-gelatinous state and then cooled into a pasty form, substantially as herein set forth.

2. An adhesive compound formed of a solution of a salt of alumina or its specified equivalent, an adhesive substance dissolved or diffused therein, and a precipitating element producing a flocculent or gelatinous precipitate throughout the adhesive mass in the effective proportion herein specified, substantially as and for the purpose set forth.

3. An improved adhesive compound, consisting of a solution of salt of alumina or its specified equivalent, a starchy or adhesive substance dissolved or diffused therein, and an alkaline substance added thereto in substantially the proportion herein set forth.

4. An improved adhesive compound consisting of a starchy or adhesive substance diffused or dissolved in a solution of a salt of alumina or its specified equivalent, and an alkaline borate added thereto, in substantially the proportion herein set forth.

5. An improved adhesive paste consisting of a starchy or adhesive substance in aqueous solution, in combination with gelatinous alumina diffused through the said solution and forming a substantial part of the mass and in such proportion to the primary adhesive matter as to impart a non-fluid or gelatinous consistency to the mixture, substantially as herein set forth.

6. An improved adhesive paste formed of digested or non-gelatinous starch in aqueous solution, in combination with a gelatinous hydrate such as gelatinous alumina diffused through the same and in such proportion as to impart a non-fluid consistency to the said solution, substantially as and for the purpose set forth.

7. A starch or flour paste impregnated with a gelatinous hydrate such as gelatinous alumina diffused through the same and in proportion relatively to the starch or flour as to form a substantial part of the adhesive mass, imparting body and non-fluidity thereto, substantially as and for the purpose herein set forth.

8. A paste formed of a salt of alumina, or its specified equivalent, water, and a starchy or adhesive substance, the salt being about one-eighth or more of the weight of the starch, substantially as herein described.

9. A paste formed of a salt of alumina or its specified equivalent, water, and a starchy or adhesive substance, the salt being about one-eighth or more of the weight of the starch, and a precipitating element sufficient to neutralize the said salt or nearly so, substantially as and for the purpose set forth.

10. The process of producing an adhesive paste, viz., dissolving or digesting a starchy or adhesive substance in solution of a salt of alumina or its specified equivalent, then gradually adding an alkaline salt and intimately mixing the same and thereby producing a soft or gelatinous precipitate throughout the adhesive mass, substantially as herein set forth.

11. The process herein described of treating starch in a hot solution of a salt of alumina or its specified equivalent until a paste is formed, and then adding an alkaline substance causing a precipitate of gelatinous alumina to become diffused through and combined with the said paste, substantially as herein set forth.

In testimony whereof I affix my signature, in the presence of two witnesses, this 11th day of November, 1897.

CHAS. M. HIGGINS.

Witnesses:
WALTER E. CLENDANIEL,
JNO. E. GAVIN.

Correction in Letters Patent No. 610,182.

It is hereby certified that in Letters Patent No. 610,182, granted September 6, 1898, upon the application of Charles M. Higgins, of New York, N. Y., for an improvement in "Adhesive Compounds," an error appears in the printed specification requiring correction, as follows: On page 4, line 90, the date "July 2, 1898," should read *July 27, 1898;* and that the said Letters Patent should be read with this correction therein that the same may conform to the record of the case in the Patent Office.

Signed, countersigned, and sealed this 27th day of September, A. D., 1898.

[SEAL.]
               THOS. RYAN,
              *First Assistant Secretary of the Interior.*

Countersigned:
 C. H. DUELL,
  *Commissioner of Patents.*